US012793460B2

(12) United States Patent
Thik et al.

(10) Patent No.: US 12,793,460 B2
(45) Date of Patent: Nov. 10, 2026

(54) METHOD AND SYSTEM FOR COLLECTION OF MATERIALS DATA FROM ACADEMIC PUBLICATIONS INTO A STRUCTURED DATA FORMAT

(71) Applicant: TOYOTA MOTOR ENGINEERING & MANUFACTURING NORTH AMERICA, INC., Plano, TX (US)

(72) Inventors: Jaydeep Thik, Ann Arbor, MI (US); Chen Ling, Troy, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 331 days.

(21) Appl. No.: 18/541,330

(22) Filed: Dec. 15, 2023

(65) Prior Publication Data

US 2025/0201015 A1 Jun. 19, 2025

(51) Int. Cl.

| | |
|---|---|
| ***G06V 30/422*** | (2022.01) |
| ***G06N 3/088*** | (2023.01) |
| ***G06V 10/26*** | (2022.01) |
| ***G06V 10/30*** | (2022.01) |
| ***G06V 30/413*** | (2022.01) |
| ***G06V 30/414*** | (2022.01) |

(52) U.S. Cl.

CPC ........... *G06V 30/422* (2022.01); *G06N 3/088* (2013.01); *G06V 10/267* (2022.01); *G06V 10/273* (2022.01); *G06V 10/30* (2022.01); *G06V 30/413* (2022.01); *G06V 30/414* (2022.01)

(58) Field of Classification Search

CPC .. G06V 30/422; G06V 10/267; G06V 10/273; G06V 10/30; G06V 30/413; G06V 30/414; G06V 10/82; G06V 30/10; G06N 3/088; G06N 3/045; G06T 7/0002

See application file for complete search history.

(56) References Cited

U.S. PATENT DOCUMENTS

| | | | | |
|---|---|---|---|---|
| 9,501,696 | B1 * | 11/2016 | Cabán | G06F 16/51 |
| 9,805,483 | B2 | 10/2017 | Wilson et al. | |
| 10,885,323 | B2 * | 1/2021 | Staar | G06V 30/413 |
| 11,321,954 | B1 * | 5/2022 | Lee | G06T 11/26 |
| 2011/0184760 | A1 * | 7/2011 | Shen | G16H 50/20 705/3 |
| 2016/0055659 | A1 | 2/2016 | Wilson et al. | |
| 2017/0351708 | A1 * | 12/2017 | Lahmann | G06T 7/74 |

(Continued)

OTHER PUBLICATIONS

Gangopadhyay et al., "Apex-Net: Automation Plot Extractor Network," Indian Institute of Technology Gandhinagar, Jan. 15, 2021, 5 pages.

(Continued)

*Primary Examiner* — Stephen R Koziol
*Assistant Examiner* — Samuel D Baynes
(74) *Attorney, Agent, or Firm* — HAYNES AND BOONE, LLP

(57) ABSTRACT

A computer implemented method is provided for digitizing an image. The method includes receiving an input document containing one or more images and extracting the one or more images from the input document. The images are then digitized, without user input, to generate a final digitization of images.

15 Claims, 10 Drawing Sheets

(56) References Cited

U.S. PATENT DOCUMENTS

| | | | |
|---|---|---|---|
| 2018/0204360 A1 | 7/2018 | Bekas et al. | |
| 2018/0211108 A1 | 7/2018 | Lahmann et al. | |
| 2018/0336405 A1* | 11/2018 | Messina | G06V 30/412 |
| 2019/0294874 A1* | 9/2019 | Orlov | G06F 40/20 |
| 2021/0081663 A1 | 3/2021 | Pandit et al. | |
| 2023/0128933 A1 | 4/2023 | Katole et al. | |

OTHER PUBLICATIONS

Jahan et al., "Locating Tables in Scanned Documents for Reconstructing and Republishing," Computer Science 7th International Conference on Information and Automation for Sustainability, Dec. 22, 2014, 6 pages.

Kanjanawattana et al., "Extraction of Graph Information Based on Image Contents and the Use of Ontology," International Association for Development of the Information Society, Dec. 1, 2016, pp. 19-26.

Kavasidis et al., "A Saliency-Based Convolutional Neural Network for Table and Chart Detection in Digitized Documents," 6th Iranian Joint Congress on Fuzzy and Intelligent Systems (CFIS) Apr. 17, 2018, 15 pages.

Lal et al., "LineFormer: Rethinking Line Chart Data Extraction as Instance Segmentation," Document Analysis and Recognition—ICDAR, May 3, 2023, 15 pages.

Luo et al., "ChartOCR: Data Extraction from Charts Images via a Deep Hybrid Framework," 2021 IEEE Winter Conference on Applications of Computer Vision, Jan. 2021, pp. 1917-1925.

Ma et al., "Towards an Efficient Framework for Data Extraction from Chart Images," Document Analysis and Recognition—ICDAR 2021, May 5, 2021, 15 pages.

* cited by examiner

METHOD AND SYSTEM FOR COLLECTION OF MATERIALS DATA FROM ACADEMIC PUBLICATIONS INTO A STRUCTURED DATA FORMAT

TECHNICAL FIELD

The subject matter described herein relates to systems and methods for automatically digitizing figures and/or images. This technology has particular, but not exclusive, utility for extracting the underlying data from figures and/or images in materials science literature.

BACKGROUND

There are many scientific and academic publications available online and in print form. However, there is not currently an efficient and accurate method available for compiling a database of such publications that allows access to the full breadth of information contained in the publications. Specifically, many databases available today contain only information extracted from the text portions of the publications, wholly ignoring the image portion of the publications. Thus, many current databases for scientific and academic publications are lacking the often vital information and data that is contained in the image portion of the publications.

The lack of information and data contained in the image portion of publications being integrated into databases is based in part on the fact that there is not currently a method for quickly and efficiently digitizing the images in the publications. Digitization of images consists of recovering the actual data points from which the plot lines or other features of the image were generated. That is, digitization of an image allows for the extraction of the vital information from the image such that it may be analyzed or made searchable in a more usable format than originally presented. Current digitization methods are time-consuming and generally fail to correctly digitize figures present in scientific and academic publications.

One of the biggest issues with current digitization methods is the amount of user input required to complete the digitization process. For example, many of the current digitization methods require that the user input various key points, such as start and end points of a plot or where the x-axis is in the image, as necessary prior knowledge for the method to digitize an image. This presents an issue, as requiring user input is very time-consuming and is inherently inaccurate, as it is difficult for the user to select the key points with a cursor or some other implement with perfect accuracy. Additionally, many of the current digitization methods experience reduced performance based on the presence of noise in the image, such as annotations, vertical lines, and insertions. Further, the current digitization methods are generally trained on synthetically generated training data with fixed axis ranges and predefined image quality standards, which generally result in the methods being unable to extrapolate accurately onto images extracted from publications.

Even those current digitization methods that are able to reasonably accurately digitize an image are only able to do so for very simple images. For example, the current digitization methods are only able to digitize an image with a single two-dimensional plot line or curve. This is a major deficiency in the current methods, as many images in scientific and academic publications are complex and have many plot lines, curves, or other features that represent important information and data.

Even further, in current digitization methods where necessary user input is limited, the system will still make generalized assumptions about the image being processed, such as that the start and end points are within a range of 0 to 1. However, this assumption is does not extrapolate well onto real-world images, where the actual range may vary greatly. As such, these semi-automated digitization methods will generally produce digitized images with values that do not align with the data that was actually used to create the input image, greatly diminishing the utility of the digitized image.

Such shortcomings of the current image digitization methods have resulted in a scarcity of information and data in current databases of scientific and academic publications. This is especially true in the field of materials science, where the lack of a robust and easily searchable database containing both text and image information from scientific and academic publications has hindered researchers for years. Thus, a need exists for an improved method for digitizing images, and more specifically, digitizing images from scientific and academic publications.

The information included in this Background section of the specification, including any references cited herein and any description or discussion thereof, is included for technical reference purposes only and is not to be regarded as limiting.

SUMMARY

The present disclosure provides a method and system for digitizing an image, utilizing three integrated modules-a segmentation module, a digitization module, and an indexing module, without requiring any user input for the digitization.

One general aspect of the present invention includes a computer implemented method for digitizing an image. The method includes receiving an input document containing one or more images and extracting the one or more images from the input document. The method also includes digitizing, without user input, the one or more images by a digitization module, where the digitization module generates a final digitization of the one or more images. The method also includes outputting the final digitization of the one or more digitized images.

Implementations may include one or more of the following features. In some embodiments of the method, digitizing the one or more images includes: fragmenting an image into a first section comprised of a set of one or more plot lines and a second section comprised of axis regions, including at least an x-axis and a y-axis; cleaning the image by removing noise from the first section of the image; identifying axis values in the axis regions of the second section of the image; generating a point-pixel coordinate table comprising locations of pixels and a corresponding numeric x-axis value and y-axis value for each pixel of the image; and creating a digitization of the image using the point-pixel coordinate table. In some embodiments, creating a digitization of the image includes: creating a preliminary digitization of the image by preparing the image, identifying the pixels of the image that correspond to the set of one or more plot lines, and using the point-pixel coordinate table, recording a set of y-coordinate values corresponding to each pixel of the set of one or more plot lines for a plurality of sampling points along the x-axis; and creating the final digitization of the image by separating the set of one or more plot lines into individual plot lines, and assigning the identified pixels of the set of one or more plot lines to one of the individual plot lines using a machine learning clustering method. In some embodiments, the method further includes after extracting the one or more images from the input document and prior to digitizing the one or more images by the digitization module, segmenting the one or more images such that one or more images are isolated from the other images. In some embodiments, fragmenting the image includes the use of a contour detection. In some embodiments, cleaning the image includes: removing vertical lines that are not part of the set of one or more plot lines; recovering any plot line information lost during the removal of the vertical lines; eliminating annotations and other text using an optical character recognition engine; detecting connected components left in the image; and removing connected components that are smaller than a standard plot line length for the image. In some embodiments, the machine learning clustering method is a DBSCAN clustering method. In some embodiments, the method further includes: extracting metadata from the input document; and storing, in a database, an original, undigitized version of the one or more images and the metadata extracted from the input document. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for digitizing an image. The system includes a processor comprising: a memory; a display; and a user interface configured to receive inputs from a user. The processor is configured to: receive an input document containing one or more images; extract the one or more images from the input document; digitize, without user input, the one or more images by a digitization module, wherein the digitization module generates a final digitization of the one or more images; and output the final digitization of the one or more digitized images. Other embodiments of this aspect include corresponding computer systems, apparatus, and computer programs recorded on one or more computer storage devices, each configured to perform the actions of the methods.

Implementations may include one or more of the following features. In some embodiments, the digitizing the one or more images by the digitization module includes: fragmenting an image into a first section comprised of a set of one or more plot lines and a second section comprised of axis regions, including at least an x-axis and a y-axis; cleaning the image by removing noise from the first section of the image; identifying axis values in the axis regions of the second section of the image; generating a point-pixel coordinate table comprising locations of pixels and a corresponding numeric x-axis value and y-axis value for each pixel of the image; and creating a digitization of the image using the point-pixel coordinate table. In some embodiments, creating a digitization of the image includes: creating a preliminary digitization of the image by preparing the image, identifying the pixels of the image that correspond to the set of one or more plot lines, and using the point-pixel coordinate table, recording a set of y-coordinate values corresponding to each pixel of the set of one or more plot lines for a plurality of sampling points along the x-axis; and creating the final digitization of the image by separating the set of one or more plot lines into individual plot lines, and assigning the identified pixels of the set of one or more plot lines to one of the individual plot lines using a machine learning clustering method. In some embodiments, the processor is further configured to, after extracting the one or more images from the input document and prior to digitizing the one or more images by the digitization module, segment the one or more images such that one or more images are isolated from the other images. In some embodiments, the processor segments the one or more images using an object detection model. In some embodiments, cleaning the image includes: removing vertical lines that are not part of the set of one or more plot lines; recovering any plot line information lost during the removal of the vertical lines; eliminating annotations and other text using an optical character recognition engine; detecting connected components left in the image; and removing connected components that are smaller than a standard plot line length for the image. In some embodiments, the processor is further configured to: extract metadata from the input document; and store, in a database, an original, undigitized version of the one or more images and the metadata extracted from the input document. Implementations of the described techniques may include hardware, a method or process, or computer software on a computer-accessible medium.

Another general aspect of the present invention includes a non-transitory computer readable storage medium storing instructions that, when executed by one or more computer processors, cause the one or more computer processors to perform series of operations. In one embodiment of this aspect, the operations include receiving an input document containing one or more images; extracting the one or more images from the input document; digitizing, without user input, the one or more images by a digitization module, where the digitization module generates a final digitization of the one or more images; and outputting the final digitization of the one or more digitized images.

Implementations may include one or more of the following features. In some embodiments, digitizing the one or more images by the digitization module includes: fragmenting an image into a first section comprised of a set of one or more plot lines and a second section comprised of axis regions, including at least an x-axis and a y-axis; cleaning the image by removing noise from the first section of the image; identifying axis values in the axis regions of the second section of the image; generating a point-pixel coordinate table comprising locations of pixels and a corresponding numeric x-axis value and y-axis value for each pixel of the image; and creating a digitization of the image using the point-pixel coordinate table. In some embodiments, creating the digitization of the image includes: creating a preliminary digitization of the image by preparing the image, identifying the pixels of the image that correspond to the set of one or more plot lines, and using the point-pixel coordinate table, recording a set of y-coordinate values corresponding to each pixel of the set of one or more plot lines for a plurality of sampling points along the x-axis; and creating the final digitization of the image by separating the set of one or more plot lines into individual plot lines, and assigning the identified pixels of the set of one or more plot lines to one of the individual plot lines using a machine learning clustering method. In some embodiments, the instructions stored on the non-transitory computer readable storage medium cause the one or more computer processors to perform operations including: after extracting the one or more images from the input document and prior to digitizing the one or more images by the digitization module, segmenting the one or more images such that one or more images are isolated from the other images. In some embodiments, segmenting the one or more images such that each image is isolated from the other images includes: separating the images into categories using an object detection model, wherein a first category comprises plots and a second category comprises non-plots, wherein a plot is an image containing one or more lines describing a trend or property; identifying a desired type of plot using a convolutional neural net; and isolating each plot of the desired types of plots from the other plots in the first category, such that the only images that are digitized via the digitization module are those images comprising a plot of the desired types. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the fuel queue management system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
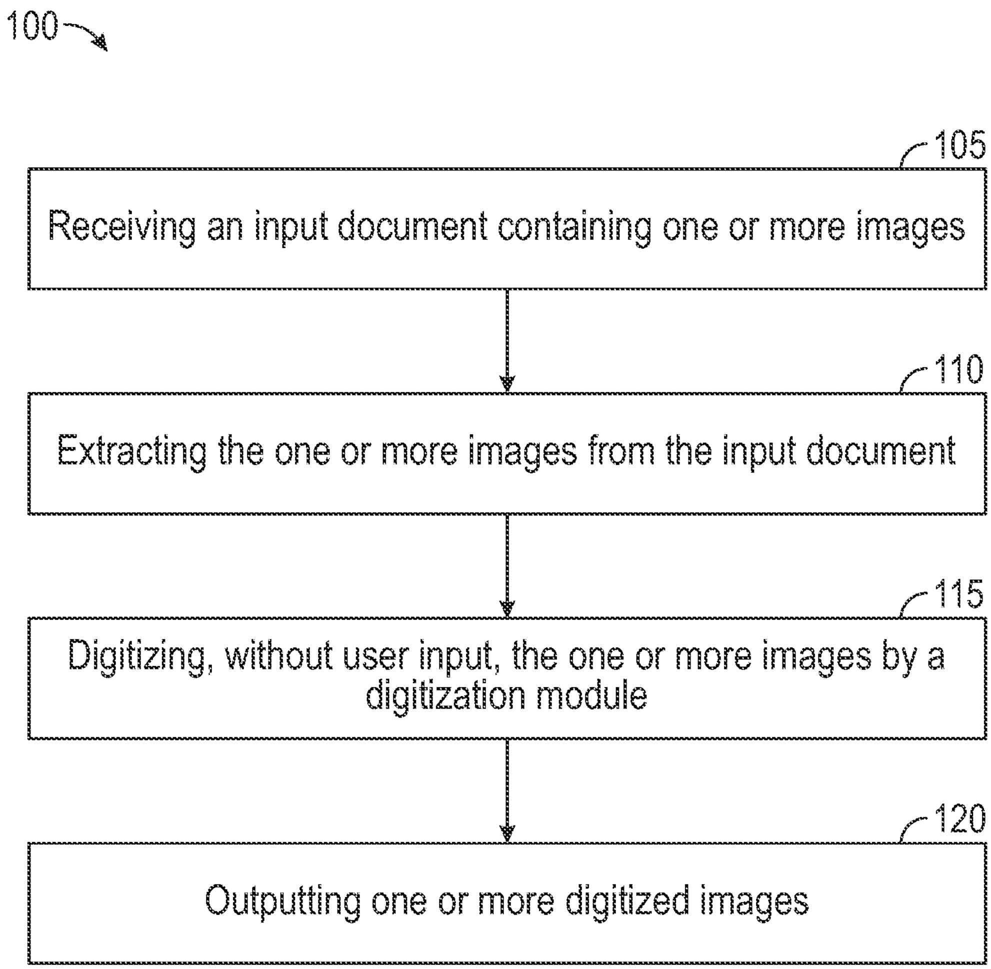
FIG. 1 is a flow diagram of an example image digitization method, in accordance with at least one embodiment of the present disclosure.

In accordance with at least one embodiment of the present disclosure, a method is provided for digitizing an image from an input document, without the need for any user input, using integrated modules for the segmentation, digitization, and indexing of the image. The digitized images may be stored in a searchable database, for example a materials database, that makes it easier and more efficient for researchers, scientists, or other individuals to access the full breadth of information available in publications.

The present disclosure aids substantially in the digitization of images from input documents, improving the accuracy and efficiency of the digitization process by, among other things, eliminating the need for any user input beyond the original input document. The method for digitizing an image disclosed herein provides a unique, robust blend of machine learning and image processing to generate digitizations of images from an input document, allowing for the data described by the image to be readily accessible and searchable in a database or other storage medium. This improved method for digitization transforms a process currently based largely on user provided prior knowledge and imperfectly trained models that often are inefficient, prone to being affected by noise, and provide imperfect data when applied to real-life images, into an automated, end-to-end, efficient, and accurate process that reliably digitizes complex images without the need for any user input or intervention. This unconventional approach improves the digitization of images and, relatedly, the availability of easily accessible, robust, and useful data by automating the image digitization process and producing consistently high-quality digitizations.

The image digitization method may be implemented by a system made up of a combination of hardware and/or software modules, and operated by a control process executing on a processor circuit that accepts user inputs from a user. In that regard, the control process performs certain specific operations in response to different inputs made at different times. Certain structures, functions, and operations of the processor circuit, sensors, and user input systems are known in the art, while others are recited herein to enable novel features or aspects of the present disclosure with particularity.

These descriptions are provided for exemplary purposes only and should not be considered to limit the scope of the image digitization method. Certain features and/or operations may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or operations described with respect to one embodiment may be combined with the features, components, and/or steps described with respect to other embodiments of the present disclosure. For the sake of brevity, however, the numerous iterations of these combinations will not be described separately.

FIG. 1 is a flow diagram of an example image digitization method 100, in accordance with at least one embodiment of the present disclosure. It is understood that method 100 may be performed in a different order than shown in FIG. 1, additional operations can be provided before, during, and after the steps, and/or some of the operations described can be replaced or eliminated in other embodiments. One or more of blocks of the method 100 can be carried out by one or more devices and/or systems described herein.

In block 105, the system receives an input document containing one or more images. In some embodiments, one or more of the images are figures, such as a line graph or another type of plot that displays data trends or properties.

In block 110, the system extracts the one or more images from the input document. In some embodiments, this means that the images contained in the document are isolated from the text portions of the document, such that the one or more images are the only portion of the input document that are further processed in the following method steps.

In block 115, the system digitizes the one or more images by a digitization module, without user input. In some embodiments, digitizing an image refers to the recovery of the actual data points from which an image is generated. Importantly, aside from providing the input document received at block 105, no input or intervention is required from the user at any point during the method 100. This means that, in some embodiments, method 100 is fully end-to-end and automated, such that a user may input a document or multiple documents and receive an output of digitized images without any further action by the user. This feature is distinguished from conventional approaches which require the user to input various key points, such as start and end points of a plot or where the x-axis is in the image, as necessary prior inputs in order for the digitization to occur. This presents an issue, as requiring user input is very time-consuming and is inherently inaccurate, as it is difficult for the user to select the key points with a cursor or some other implement with perfect accuracy. Accordingly, the methods described herein overcome those limitations by providing methods that do not require user input in order to conduct the digitization.

In block 120, the outputs the one or more digitized images. In some embodiments, digitizing an image results in a tabular output containing the data that the input image was generated from. In other embodiments, digitizing an image results in an output that is a digital version of the input image with the underlying data presented in the same format that it was in the input image. The output of one or more digitized images may be displayed to the user in this block, or may be stored in a database, as further described in FIG. 5 below.

Figure 2:
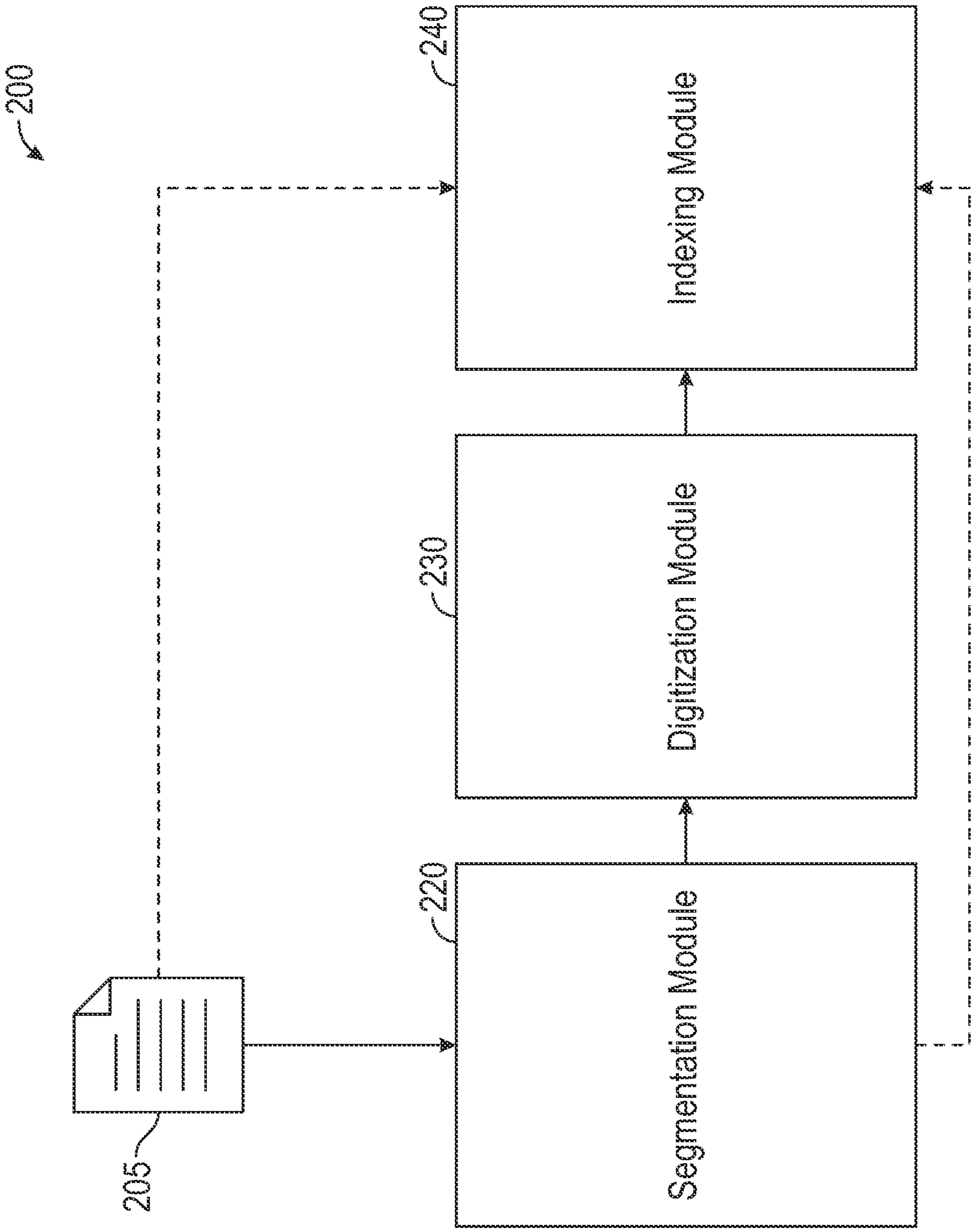
FIG. 2 is a diagrammatic illustration, in a block-diagram form, of at least a portion of a system for digitizing an image, in accordance with at least one embodiment of the present disclosure.

FIG. 2 is a diagrammatic illustration, in a block-diagram form, of at least a portion of a system for digitizing an image, in accordance with at least one embodiment of the present disclosure. In an example, image digitization system 200 requires an input document 205, a segmentation module 220, a digitization module 230, and an indexing module 240. The modular nature of the system is advantageous, as it allows for user customization via the addition of additional modules, removal of modules, or the modification of existing modules. In each instance, this provides the user with a high degree of control over the image digitization process and the data that the image digitization process outputs. In some embodiments, the indexing module 240 is operably coupled to, and adapted to be in communication with, a database. In other embodiments, either segmentation module 220 or indexing module 240 may be excluded from the image digitization system 200. In even further embodiments, both segmentation module 220 and indexing module 240 may be excluded from the image digitization system 200.

In some embodiments, the input document 205 consists of a document with text portions and image portions, for example, a scientific research paper or other academic or industry publication. In other embodiments, the input document 205 is a single image or a group of images with no text portion. In some examples, the image or images of the input document 205 are figures, such as a line graph or another type of plot which displays data trends like Raman Spectra, XRD, or FTIR plots.

In some embodiments, the input document 205 is input into segmentation module 220. In some examples, the input document 205 is processed prior to being input into segmentation module 220, such that the one or more images are extracted from input document 205. In some example embodiments, segmentation module 220 processes the images input into it by isolating individual images from other input images and passing the isolated images to digitization module 230 for further processing. In other example embodiments, segmentation module 220 processes the images input into it by isolating individual images from other input images, identifying images of a desired type, and selectively passing images of the desired type to digitization module 230 for further processing.

In some embodiments, digitization module 230 receives pre-processed images from segmentation module 220. In other embodiments, digitization module 230 receives images from other external sources, which may be pre-processed or not pre-processed, such as a direct input from a user or from a connected database. In some example embodiments, digitization module 230 performs a sequence of processes on the input image, without user input, such that a final digitization of the image is output. In some embodiments, digitization module 230 uses various image cleaning procedures and leverages machine learning to automate the digitization of the image, such that no user input or intervention is required aside from the input of an original input document 205 or other input image.

In some embodiments, indexing module 240 receives a final digitization of one or more images from digitization module 230. In other examples, indexing module 240 receives other input data or images from external sources, such as user input or a connected database. In yet another embodiment, indexing module 240 may receive pre-processed images directly from segmentation module 220, bypassing digitization module 230. In some example embodiments, indexing module 240 creates a database of the digitized images received from the digitization module 230. This database may be searchable. In some examples, the database also contains additional data about the digitized images, such as copies of the original, unprocessed image and metadata extracted from the original input document 205. In instances where additional data about the digitized images is also stored in the database, the digitized images may be indexed to match the additional data corresponding to each digitized image. Indexing the digitized images and the additional data in this way improves the searchability of the information in the database, making it simpler and more efficient for a researcher or other user to access desired data.

Figure 3:
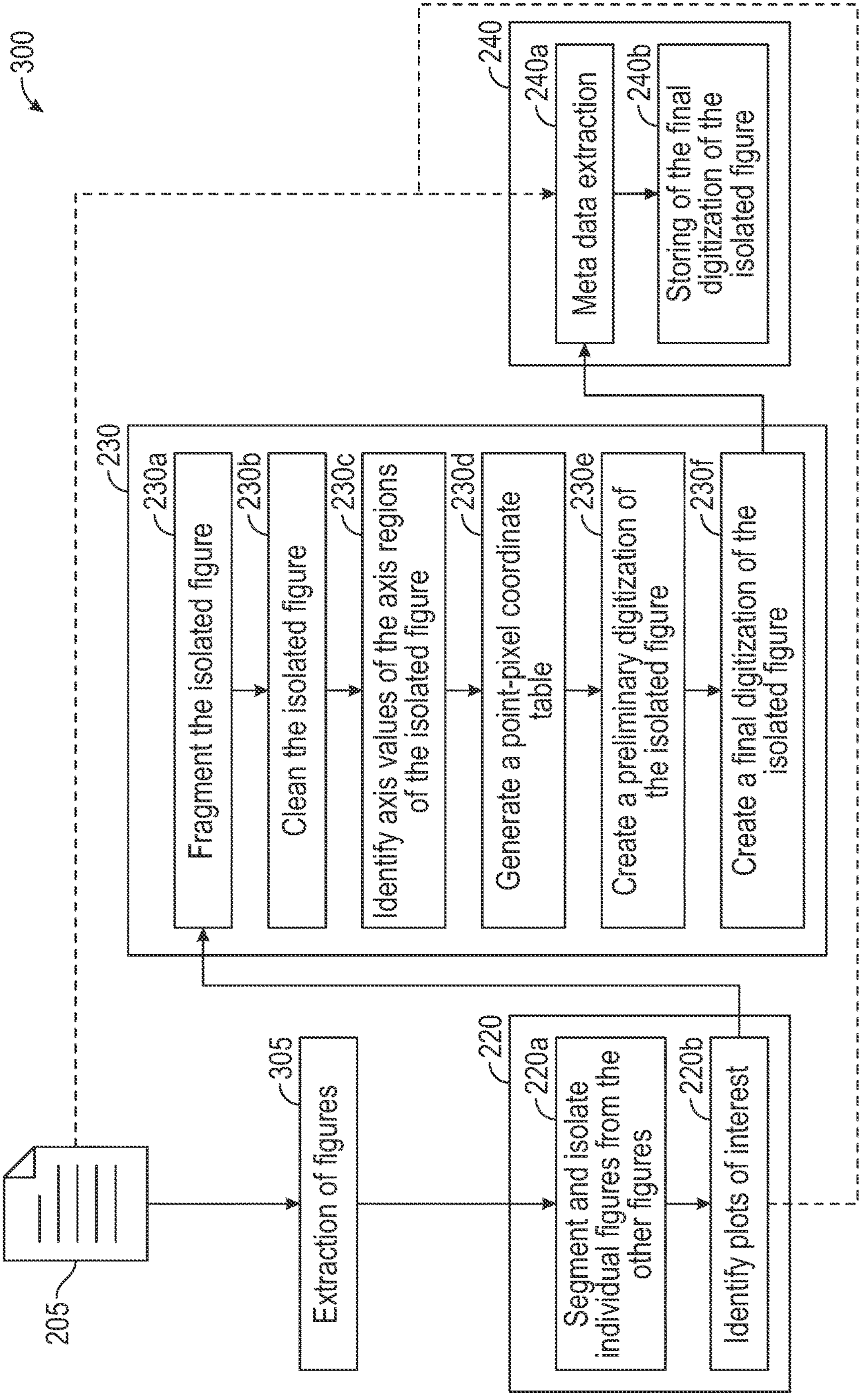
FIG. 3 is a flow diagram of an example image digitization method overlayed on the block-diagram of the system of FIG. 2, in accordance with at least one embodiment of the present disclosure.

FIG. 3 is a flow diagram of an example image digitization method 300 overlayed on the block-diagram of the image digitization system 200 of FIG. 2, in accordance with at least one embodiment of the present disclosure. The purpose of the overlay is to demonstrate how, in certain embodiments, the blocks of image digitization method 300 are performed by segmentation module 220, digitization module 230, and indexing module 240.

Image digitization method 300 begins with the system receiving an input document 205. Input document 205 may consist of a document with text portions and image portions, for example, a scientific research paper or other academic or industry publication. In other examples, the input document 205 is a single image or a group of images with no text portion. In some examples, the image or images of the input document 205 are figures, such as a line graph or another type of plot which displays data trends like Raman Spectra, XRD, or FTIR plots.

At block 305, the system extracts images from the input document 205. In some embodiments, this means that the images contained in the input document 205 are isolated from the text portions of the input document 205, such that the one or more images are the only portion of the input document 205 that are further processed in the following method blocks. In other embodiments, the input document 205 is comprised only of images. In such embodiments, this block 305 may be skipped, and the input document 205 fed immediately into segmentation module 220. In other embodiments, the input document 205 is comprised of only text portions. In such embodiments, the input document 205 may forgo processing via the remaining method blocks entirely and may immediately be stored in a database or other storage medium.

In some embodiments, method blocks 220*a* and 220*b* are performed as part of segmentation module 220 following the extraction of the images from input document 205 in block 305. First, the images extracted from the image document 205 at block 305 are received by the segmentation module 220. Then, at block 220*a*, the extracted images are segmented, such that each individual image is isolated from the others.

Figure 4:
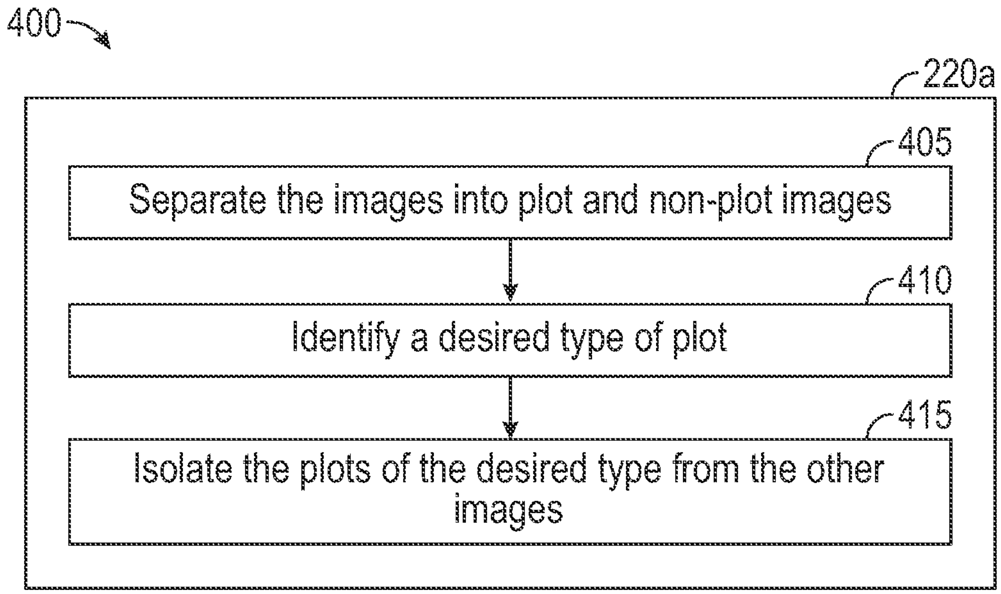
FIG. 4 is a diagrammatic illustration of at least a portion of the example image digitization method of FIG. 3, in accordance with at least one embodiment of the present disclosure.

FIG. 4 provides a more detailed flow diagram of the blocks of sub-method 400 performed to segment and isolate the input images at block 220*a*, according to at least one embodiment of the present disclosure. First, at block 405, the system separates input images into plot and non-plot images. A plot may be an image that comprises continuous lines, dashed lines, or other visual indicia that describe a trend in or property of data. Generally, plots will also comprise an x-axis and a y-axis. For example, types of plots may include line graphs with plot lines, such as Raman Spectra, XRD, FTIR, or other similar types of images. Non-plots may be images that do not describe a trend in or property of data. For example, types of non-plots may include photographic or pictorial images, SEM, TEM, or flow charts. In some embodiments, the determination of what images are plots and what images are not plots is made by an object detection model, such as M-RCNN. In some examples, the object detection model is trained with a ResNet-50 base using datasets of multiple sizes to isolate and/or segment out plots and non-plots into two discrete categories.

Next, at block 410, one or more types of plots are identified by the system as the types that are desired to be digitized. Reasons that a particular type of plot may be desired include, but are not limited to, the type of data presented in the plots of that type, the industry or field that the data displayed in the images originated, and the industry or field that the user is in. In some embodiments, the desired type of plot is determined and input by a user. In other embodiments, the desired type of plot is automatically identified by an image digitization system, such as image digitization system 200. In some examples, multiple types of plots may be identified as desired. In some example embodiments, the desired type of plot is all plots, such that all images that are plots will be digitized.

Once the one or more type of desired plot is identified, at block 415, the images that are the desired type of plot are isolated from the other images, including the non-plot images and images that are of an undesired plot type. In some embodiments, a Convolutional Neural Net is trained to identify images of the desired type of plot from the other images. In some embodiments, an input image may comprise a panel of individual images or images embedded in other images. In such embodiments, the method may further include cropping the individual images from the panel or cropping individual images embedded in other images. In some examples, the individual images are copped from the panel using predicted bounding boxes generated by an object detection model.

Returning now to FIG. 3, at block 220*b*, the images of interest are identified and passed to the digitization module 230 for further processing. In some embodiments, the images of interest are those images of the one or more desired plot type. In other embodiments, the images of interest are all plots. At this point, the images that are not identified as an image of interest may be discarded or stored in a connected database as metadata associated with images that will be fully digitized from the same input document 205.

Once the isolated or segmented images are passed from the segmentation module 220 to the digitization module 230, in some embodiments of the present disclosure, digitization of the images begins. First, at block 230*a*, the system fragments an isolated image into multiple sections. In some embodiments, an isolated image/is fragmented into two sections-section P, which comprises the portions of the image the display a trend in or property of data, such as plot lines, without axis regions, and section I-P, which comprises only the axis regions. In some embodiments, the fragmentation of the isolated image is performed using image processing methods of contour detection. Contour detection identifies the biggest contours available in the image (generally the plot line or plot lines), which allows for the plot lines of section P to be separated from the rest of the image. Importantly, none of the techniques of block 230*a* of the present disclosure require label data or any outside information to be able to identify and separate out the plot lines.

Next, at block 230*b*, the system removes unwanted noise from the isolated image, such that the only remaining item(s) in section P are the plot lines. The cleaning of the image prior to undergoing the full digitization process ensures a more accurate digitization, unaffected by noise in the image. Common types of noise include annotations, vertical lines, gridlines, and text, such as titles.

Figure 5:
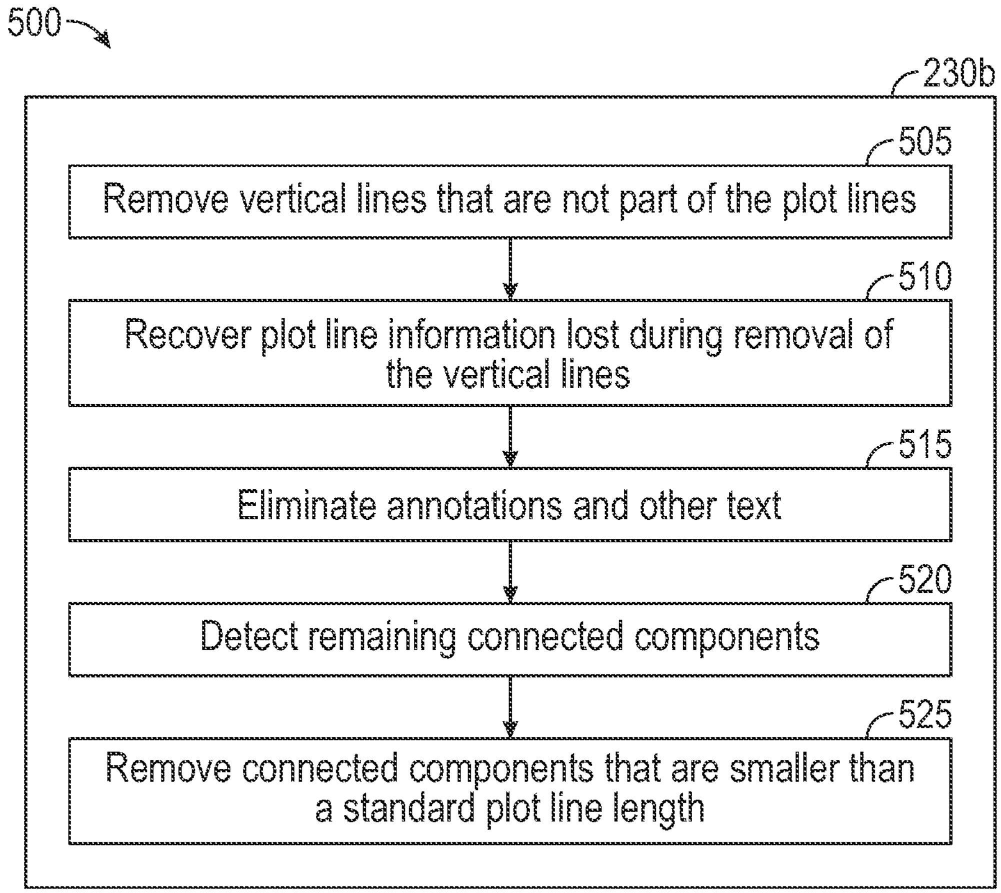
FIG. 5 is a diagrammatic illustration of at least a portion of the example image digitization method of FIG. 3, in accordance with at least one embodiment of the present disclosure.

FIG. 5 provides a more detailed flow diagram of the blocks of a sub-method 500 performed to clean the isolated images at block 230*b*, according to at least one embodiment of the present disclosure. Prior to beginning the detailed description of the sub-method 500, it should be noted that the blocks of sub-method 500 may be performed in any order, and that the description of the blocks in any particular order is for illustrative purposes only. Further, it is understood that any single block or combination of blocks of sub-method 500 may be excluded in different embodiments of the present disclosure.

First, at block 505, the vertical lines that are not part of the plot lines of section P of the isolated image are removed by the system. In some embodiments, the vertical lines are removed using image processing techniques of thresholding, erosion, and dilation. Next, at block 510, any plot line information that was lost during the removal of the vertical lines at block 505 is recovered. Next, at block 515, annotations and other text are removed from section P of the isolated image. In some embodiments, annotations and text are removed from section P of the isolated image using an Optical Character Recognition (OCR) engine, such as a Pytesseract OCR. The OCR engine identifies and removes unwanted characters, such as those in annotations and other text in section P of the isolated image. Generally, this is where current methods of image cleaning will stop. However, the effectiveness of an OCR engine at removing unwanted characters is dependent upon the quality of the image that the OCR engine is processing. The quality of available images is highly variable, especially among open-access research or other scientific and industry literature. As such, blocks 505 through 515 may be sufficient to fully clean a high-quality image but may not result in the removal of all noise from a lower quality image. As such, in some embodiments of the present disclosure, the sub-method 500 further includes block 520 and block 525 to complete the cleaning of the image and remove any noise that is leftover after block 505 through block 515. At block 520, any connected components remaining in the section P of the isolated image are identified using image processing techniques. At block 525, any connected component that is smaller (or shorter) than the plot lines in the section P of the isolated image is removed. The cleaning block 525 results in the removal of any noise that was leftover in section P after block 505 through block 515, producing a fully cleaned image that may be more accurately and efficiently digitized.

Returning now to FIG. 3, at block 230*c*, the axis values of the axis regions in section I-P of the isolated image are identified by the system. Generally, the axis values of both the x-axis and the y-axis will be determined, however, in some embodiments, only the values on one of the x-axis or y-axis may be identified. In some embodiments, the axis values are identified using OCR. In some examples, the identification of the axis values only requires an input of an image with at least one axis. This is in contrast to the current methods of axis value identification, which require that the user provide prior knowledge, such as the start and end points of an axis. In the event that identification of the axis values at block 230*c* fails for any reason, a default scale may be applied to an axis in lieu of the actual axis values. In some embodiments, the default scale applied to an axis is 0-1000.

At block 230*d*, a point-pixel coordinate table is generated for the isolated image. A point-pixel coordinate table is a data structure comprising locations of pixels and a corresponding numeric x-axis and y-axis value for each pixel. In some embodiments, the point-pixel coordinate table contains the locations and corresponding numeric x-axis and y-axis value for every pixel of an image. In other embodiments, the number of sampling points M may be controlled. For example, pixels may only be sampled at M points between the beginning and ending values of the x-axis. Characteristically, the higher the value of M, the more precise the results of the subsequent digitization will be. In some examples, an M value of 1000 is used to optimize accuracy and efficiency.

At block 230*e*, a preliminary digitization of the isolated image is created. Then, at block 230*f*, a final digitization of the isolated image is created. The problem of image digitization, particularly for plots, can be formulated as follows. For a general scientific figure (e.g., a plot) described as a 3-channel RGB image $I \in [0,255]^{H \times W \times 3}$, where H is the height of the image and W is the width of the image, containing K plot lines, the goal of an end-to-end digitization process is to recover:

$$K \text{ and } \mathcal{D} = \{X, Y\} \in \mathbb{R}^{K \times M}, \text{ where } \{X, Y\} = \{(x_k^i, y_k^i)_{i=1}^{M_k}\}, \forall k \in \mathbb{Z}: k \in [1, K].$$

$$x_k^i \text{ and } y_k^i$$

are the x and y coordinates of the $i^{th}$ sample of the $k^{th}$ plot line and $M_k$ is the number of sampled points in the $k^{th}$ plot.

Figure 6:
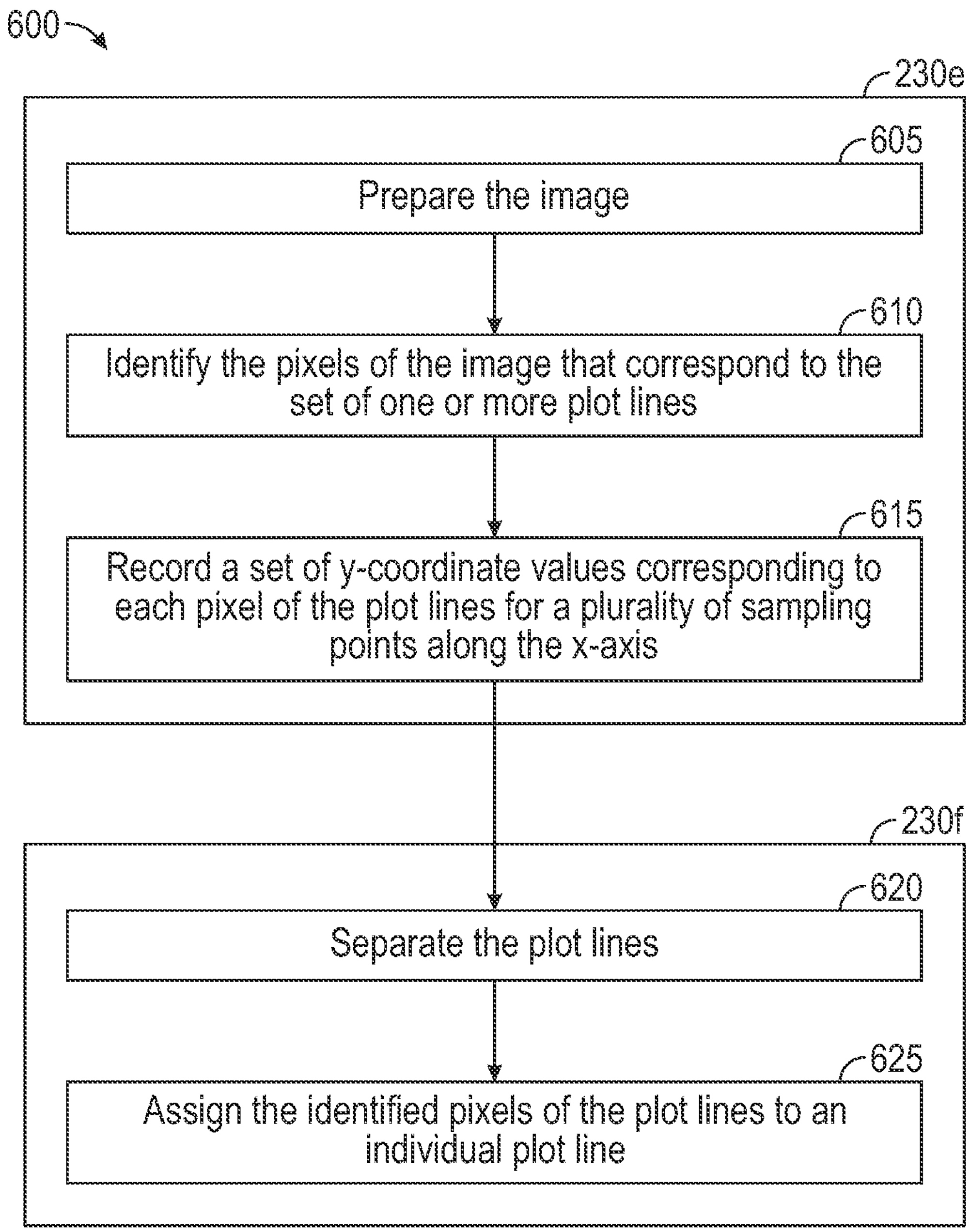
FIG. 6 is a diagrammatic illustration of at least a portion of the example image digitization method of FIG. 3, in accordance with at least one embodiment of the present disclosure.

FIG. 6 provides a more detailed flow diagram of the blocks of sub-method 600 performed to prepare a preliminary digitization of an isolated image at block 230*c* and a final digitization of an isolated image at block 230*f*, according to at least one embodiment of the present disclosure.

At the outset of sub-method 600, the system receives a clean, noise-free, isolated image with information about the location of plots in the image and a point-pixel coordinate with correctly identified axis points. At block 605, the clean image is prepared for digitization. In some embodiments, preparing the clean image for digitization includes enhancing any one or combination of, the sharpness, contrast, and brightness of the clean image. In some embodiments, preparing the clean image includes creating a binary image with plot lines separated from the background of the cleaned image by using any one or combination of, gray scaling, thresholding, and inversion on section P of the cleaned image. In some embodiments of the present disclosure, the resultant binary image is black and white, wherein the plot lines are black, and the background of the image is white.

Next, at block 610, the prepared image is analyzed by the system to identify the pixels of the prepared image that correspond to the plot lines of the prepared image.

Next, at block 615, a set of y-coordinate values that corresponds to each pixel of the plot lines for a plurality of sampling points along the x-axis is recorded. In some embodiments, recording the set of y-coordinates includes using the point-pixel coordinate table to record the pixel y-coordinate locations corresponding to each identified plot line for each sampled x-axis value in M. In some examples, this is achieved via a two-block repetitive process, where an algorithm runs iteratively from left to right along the x-axis and records the corresponding y-coordinate values of pixels identified as being associated with a plot line for each sample point in M along the x-axis. At the completion of block 615, wherein the y-coordinate values that correspond to each pixel of the plot lines for all of the sampling points M along the x-axis are recorded, the result is a preliminary digitization of the prepared image. In some embodiments, the preliminary digitization of the prepared image is a structured data containing a set of digitized points, meaning x and y coordinate values corresponding to the pixels of the identified plot lines in the prepared image. However, it is still not possible to determine K, the number of plot lines, or to subsequently assign the digitized points to the correct plot line. Further, since the availability of large, annotated data is scarce in the applicable domains and synthetic data rarely is able to mimic the actual image quality for digitization results to be useful, the use of supervised learning algorithms to determine K and assign digitized points to the correct plot lines is not feasible.

In some embodiments, to address the issues of identifying the number of plot lines and assigning digitized points to the correct plot line, image digitization method 300 creates a final digitization of the image at block 230*f*. In some embodiments, after a preliminary digitization of an image is created at block 230*c*, further processing and digitization of the image is carried out. First, at block 620, the plot lines of the preliminary digitization of the image are separated out into individual plot lines. In some embodiments, the first operation in separating out the plot lines is to recover the color information of the digitized points. Then, in some embodiments, unsupervised machine learning methods of clustering may be applied. Clustering is the process of grouping a set of objects, or in this case digitized points, in such a way that objects in the same group are more similar to each other than to those in other groups. Clustering is an advantageous method, as it provides a two-fold advantage of eliminating noise points and predicting the number of clusters of arbitrary shape to estimate the number of plot lines K'. In some embodiments, the cluster method used is Density Based Spatial Clustering of Applications with Noise (DBSCAN). In some examples, the DBSCAN has a ten-dimensional input, which may be, for example, Red, Green, Blue, Lightness, Green/Magenta Chromatic Axis, Blue/Yellow Chromatic Axis, Luminance, Chroma Red, and Chroma Blue color space transforms of the image, and the set of y-coordinate values corresponding to each pixel of the set of one or more plot lines for every sampling point along the x-axis. Each of these inputs is a different color transform that may be executed on the image prior to processing by the cluster method. The operation of the DBSCAN with respect to the various inputs corresponding to the different color transformations of the image is to pull and compare the color values corresponding to the digitized points for each such color transformation and cluster similar digitized points into one or more clusters, each representing an individual identified plot line. A particular issue may arise when the plot lines of the image intersect with one another or if the color values of a plot line are not consistent along its entire length. To address this issue, in some embodiments, the first operation to separate out the individual plot lines may be to carry out a distance transformation on the image to identify the core portion of the plot line by eliminating noisy boundary points.

The quality of a digitization is highly dependent on the quality of the input image. In some example embodiments of the present disclosure, the image digitization method 300 can identify individual plot lines when the input image has a DPI of 300 or higher and a width greater than 400 pixels. This may be especially beneficial, as many literature depositories from which an input document may be pulled maintain a standard image quality that is at or higher than the quality that may be accurately and efficiently digitized by image digitization method 300.

At block 625, the digitized points are assigned to the correct plot lines of the image. In some embodiments, the output of block 625 is a final digitization of the image that was input into the digitization module 230. In some examples, the final digitization of an image is a tabular version of the image containing information about and data underlying the plot lines therein. In some embodiments, a final digitization will contain all digitized points of an image assigned to one of the plot lines of the image. In some embodiments, the final digitization may also include the original unprocessed input image.

Returning now to FIG. 3, the fully digitized image is passed from the digitization module 230 to the indexing module 240. Once indexing module 240 receives the digitized image, at block 240*a*, metadata may be extracted from the digitized image. In some embodiments, metadata is extracted from the input image 205. In some embodiments, metadata is extracted from non-plot images or plot images that are not of the desired type. Some non-limiting examples of metadata that may be collected at block 240*a* includes, the name of the author, the title, the document ID, a summary, and the abstract of the input document 205.

At block 240*b*, the digitized image is stored. In some embodiments, the digitized image is stored in a database, cloud storage, or other easy-to-access storage medium. In some embodiments, the database where the digitized image is stored also contains metadata about the input document 205 from which the image originated. In some embodiments, the database where the digitized image is stored also contains a copy of the unprocessed image. In some examples, the digitized images in a database are indexed such that they are matched with the corresponding original unprocessed images and metadata from the input document 205 from which the image originated to make the digited image easily searchable.

Block diagrams are provided herein for exemplary purposes; a person of ordinary skill in the art will recognize myriad variations that nonetheless fall within the scope of the present disclosure. For example, block diagrams may show a particular arrangement of components, modules, services, blocks, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the blocks described herein into a plurality of machine instructions and may execute these instructions at the rate of several hundred, several thousand, several million, or several billion per second, in a single processor or across a plurality of processors. Such rapid execution may be necessary in order to execute the method in the highly efficient manner described herein.

FIG. 7 through FIG. 10 are each illustrative examples of an input and an output of an image digitization method, in accordance with at least one embodiment of the present disclosure. Each Figure demonstrates a different challenge that the image digitization method of the present disclosure is able to address.

Figure 7:
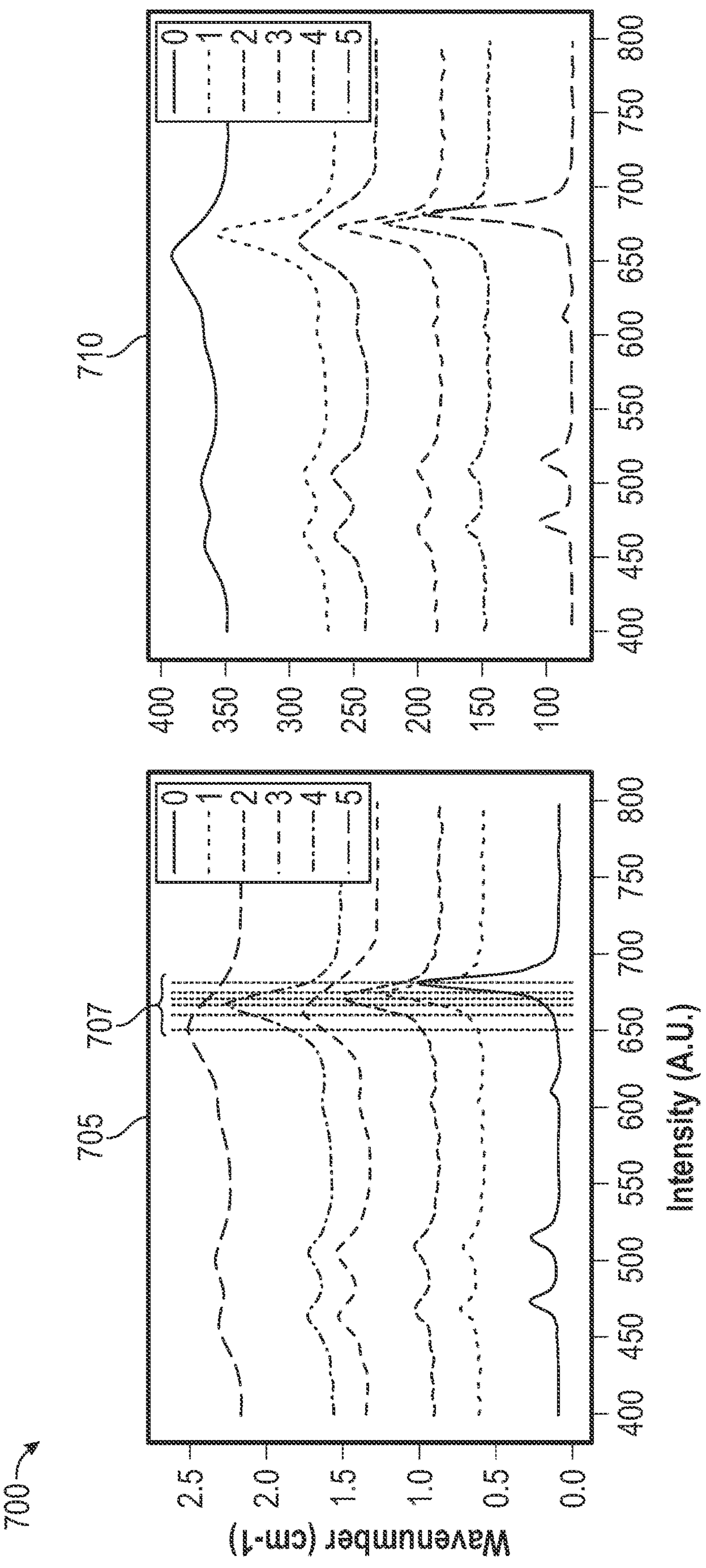
FIG. 7 is an illustrative example of an input and an output of an image digitization system, in accordance with at least one embodiment of the present disclosure.

FIG. 7 demonstrates the cleaning capabilities of an image digitization method, in accordance with at least one embodiment of the present disclosure. The original, raw input image 705 contains a number of vertical lines 707 that do not carry any significant information. Thus, these vertical lines are noise. The digitized reconstruction 710 may be created when input image 705 is run through an image digitization method, in accordance with at least one embodiment of the present disclosure. The digitized reconstruction 710 of input image 705 is cleaned of the vertical lines without impact to the integrity of the digitization, demonstrating the capacity of the image digitization method to remove perforated, dashed, or continuous vertical lines.

Figure 8:
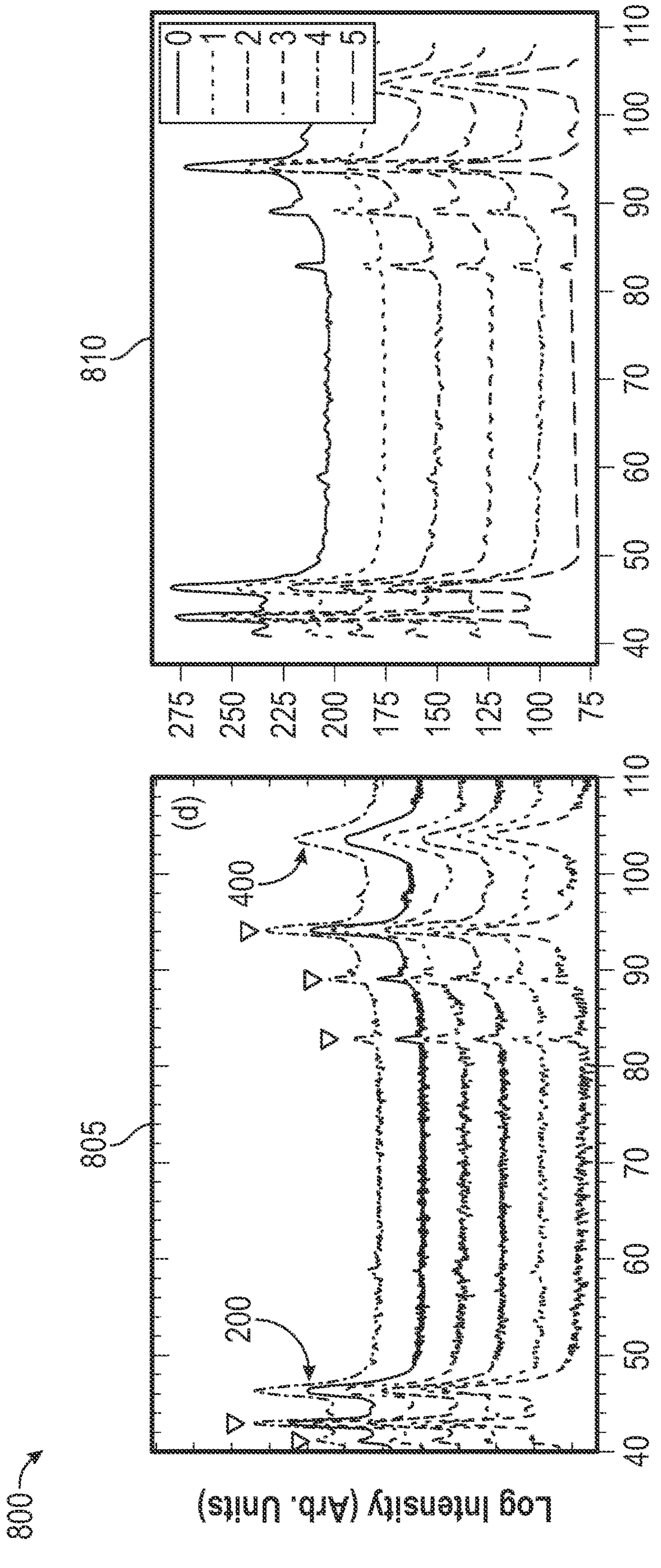
FIG. 8 is an illustrative example of an input and an output of an image digitization system, in accordance with at least one embodiment of the present disclosure.

FIG. 8 further demonstrates the cleaning capabilities of an image digitization method, in accordance with at least one embodiment of the present disclosure. The original, raw input image 805 contains unwanted annotations (e.g., "200" and "400", along with accompanying arrows and the label "Log Intensity (Arb. Units)" on the y-axis) that do not carry any significant information. Thus, these annotations are noise. The digitized reconstruction 810 may be created when input image 805 is run through an image digitization method, in accordance with at least one embodiment of the present disclosure. The digitized reconstruction 810 is cleaned of the unwanted annotations without impact to the integrity of the digitization, demonstrating the capacity of the image digitization method to remove unwanted annotations like insertions, pointers, arrows, and legend boxes. Other examples of the image digitization method, in accordance with at least one embodiment of the present disclosure, cleaning images of unwanted annotations are displayed in FIGS. 7, 9, and 10.

Figure 9:
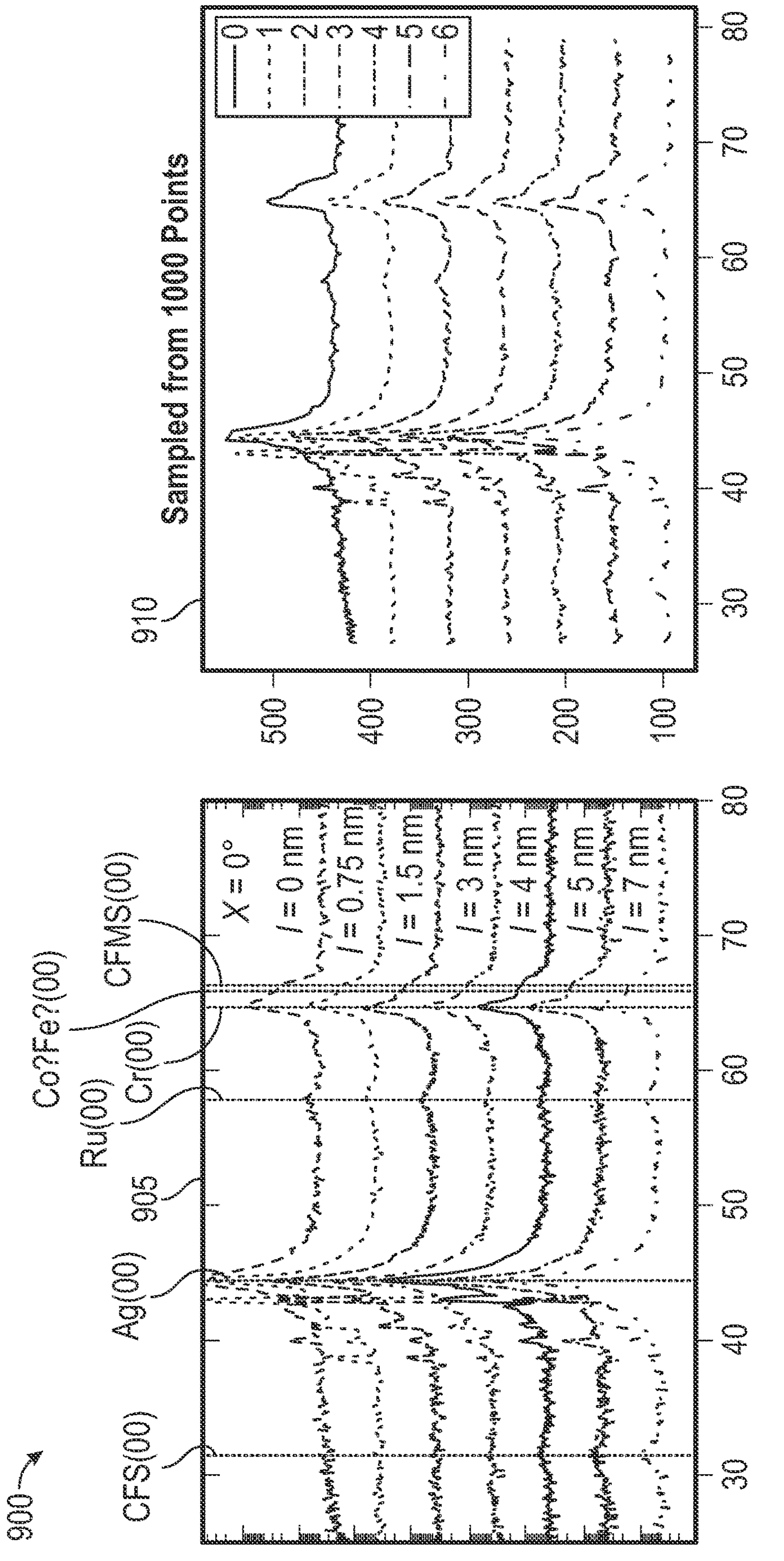
FIG. 9 is an illustrative example of an input and an output of an image digitization system, in accordance with at least one embodiment of the present disclosure.

FIG. 9 demonstrates the capability of an image digitization method, in accordance with at least one embodiment of the present disclosure, to disentangle overlapping plot lines. The original, raw input image 905 contains a number of intersecting and intermixing plot lines that are difficult even for the human eye to distinguish. The digitized reconstruction 910 may be created when input image 905 is run through an image digitization method, in accordance with at least one embodiment of the present disclosure. The digitized reconstruction 910 of input image 905 showcases an accurate reproduction of the input image 905, demonstrating the capacity of the image digitization method to disentangle and separate large quantities of heavily entangled and intersecting plot lines.

Figure 10:
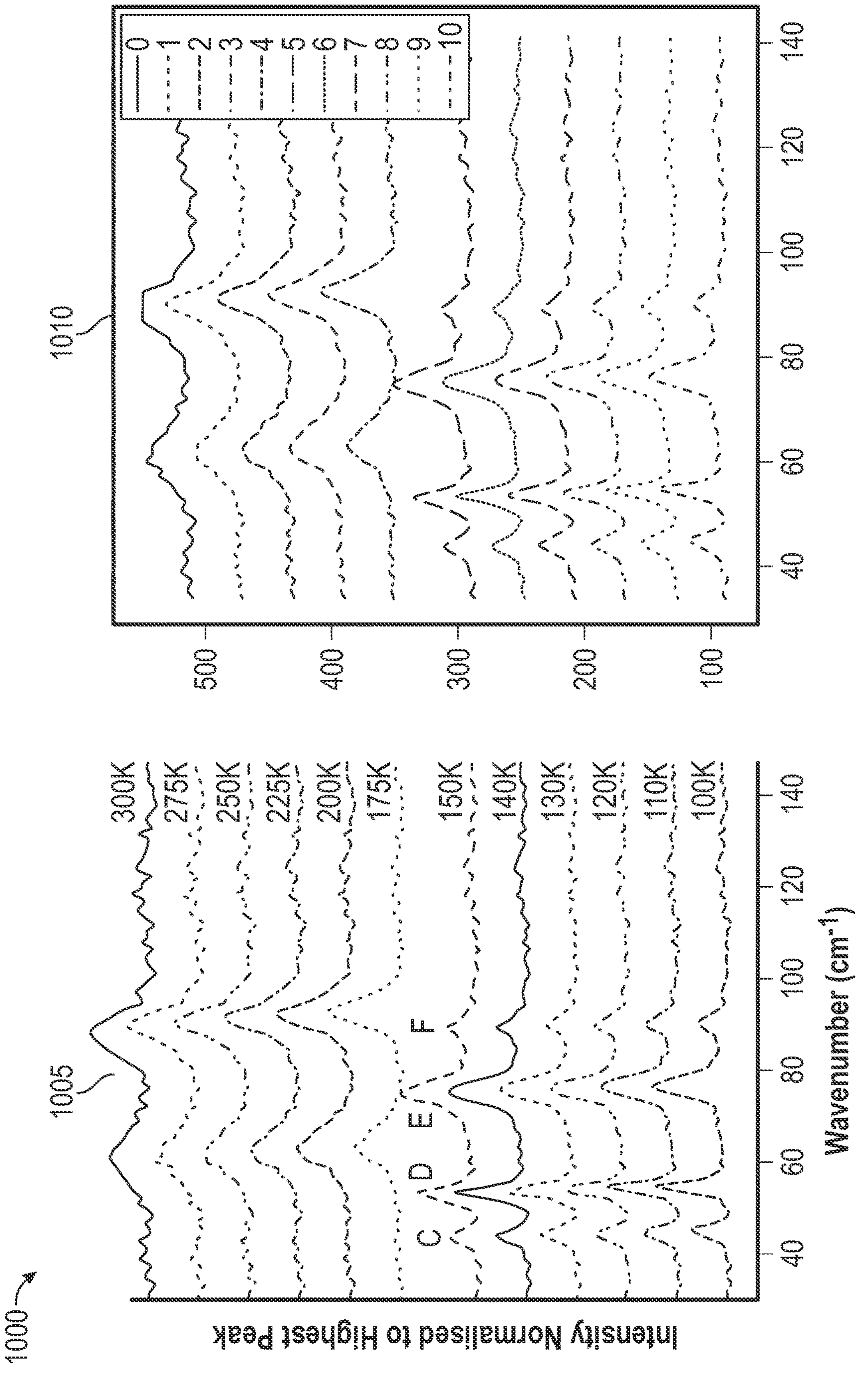
FIG. 10 is an illustrative example of an input and an output of an image digitization system, in accordance with at least one embodiment of the present disclosure.

FIG. 10 demonstrates the capability of an image digitization method, in accordance with at least one embodiment of the present disclosure, to digitize many plot lines in a single image. The original, raw input image 1005 contains ten individual plot lines. The digitized reconstruction 1010 may be created when input image 1005 is run through an image digitization method, in accordance with at least one embodiment of the present disclosure. The digitized reconstruction 1010 of input image 1005 showcases an accurate reproduction of the input image 1005, demonstrating the capacity of the image digitization method to digitize a large number of plot lines in a single image without any degradation in quality of the digitization.

Here it should be noted that in FIGS. 7, 8, 9, and 10, the digitized reconstructions 710, 810, 910, and 1010 each display values along the y-axis that are equivalent to the height of the image in pixels. In some embodiments of the present disclosure, this is how a digitized image may be displayed. In other embodiments, the values displayed on the y-axis may be values that correspond to the actual values of the y-axis in the input image.

Figure 11:
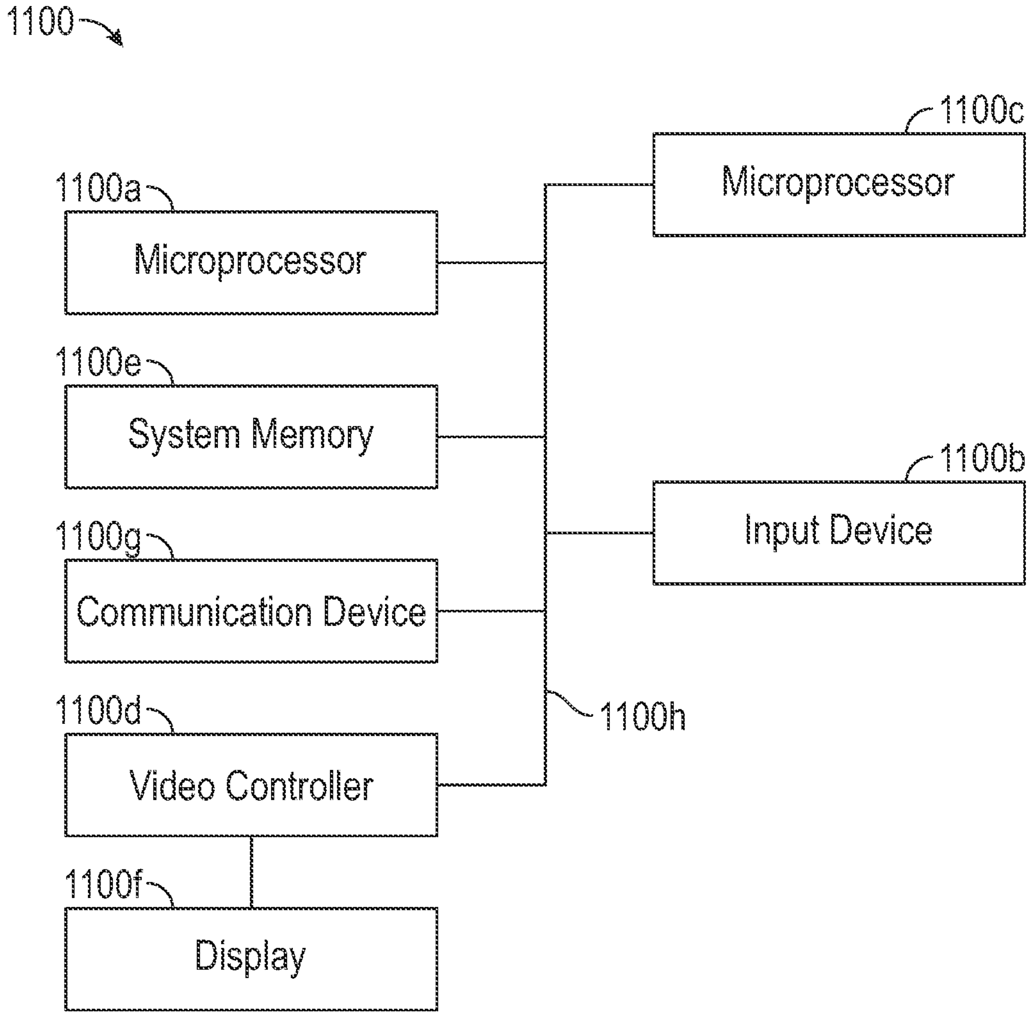
FIG. 11 is a diagrammatic illustration of a system for implementing one or more example embodiments of the present disclosure, according to an example embodiment.

FIG. 11 is a diagrammatic illustration of a system for implementing one or more example embodiments of the present disclosure, according to an example embodiment.

The illustrative system 1100 includes a microprocessor 1100*a*, an input device 1100*b*, a storage device 1100*c*, a video surface control system 1100*d*, a system memory 1100*c*, a display 1100*f*, and a communication device 1100*g* all interconnected by one or more buses 1100*h*. In several example embodiments, the storage device 1100*c* may include a floppy drive, hard drive, CD-ROM, optical drive, any other form of storage device and/or any combination thereof. In several example embodiments, the storage device 1100*c* may include, and/or be capable of receiving, a floppy disk, CD-ROM, DVD-ROM, or any other form of computer-readable medium that may contain executable instructions. In several example embodiments, the communication device 1100*g* may include a modem, network card, or any other device to enable the system to communicate with other systems. In several example embodiments, any system represents a plurality of interconnected (whether by intranet or Internet) computer systems, including without limitation, personal computers, mainframes, PDAs, smartphones, and cell phones.

In several example embodiments, one or more of the components of the systems described above and/or illustrated in FIGS. 2-3 include at least the illustrative system 1100 and/or components thereof, and/or one or more system that are substantially similar to the illustrative system 1100 and/or components thereof. In several example embodiments, one or more of the above-described components of the illustrative system 1100 and/or the example embodiments described above and/or illustrated in FIGS. 2-3 include respective pluralities of same components.

In several example embodiments, one or more of the applications, systems, and application programs described above and/or illustrated in FIGS. 1-6 include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous Javascript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a system such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1100*a*, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

The logical operations making up the embodiments of the technology described herein are referred to variously as operations, blocks, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the fuel queue management system or its components. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide an enabling description of the structure and use of exemplary embodiments of the fuel queue management system as defined in the claims. Although various embodiments of the claimed subject matter have been described above with a certain degree of particularity, or with reference to one or more individual embodiments, those skilled in the art would understand that numerous alterations to the disclosed embodiments are contemplated without departing from the spirit or scope of the claimed subject matter.

The Abstract at the end of this disclosure is provided to comply with 37 C.F.R. § 1.72 (b) to allow the reader to quickly ascertain the nature of the technical disclosure. It is submitted with the understanding that it will not be used to interpret or limit the scope or meaning of the claims.

Methods within the scope of the present disclosure may be local or remote in nature. These methods, and any controllers discussed herein, may be achieved by one or more intelligent adaptive controllers, programmable logic controllers, artificial neural networks, and/or other adaptive and/or "learning" controllers or processing apparatus. For example, such methods may be deployed or performed via PLC, PAC, PC, one or more servers, desktops, handhelds, and/or any other form or type of computing device with appropriate capability.

Still other embodiments are contemplated. It is intended that all matter contained in the above description and shown in the accompanying drawings shall be interpreted as illustrative only of particular embodiments and not limiting.

Changes in detail or structure may be made without departing from the basic elements of the subject matter as defined in the following claims.

What is claimed is:

1. A computer implemented method for digitizing an image, the method comprising:

receiving an input document containing one or more images;

extracting the one or more images from the input document;

digitizing, without user input, the one or more images by a digitization module, wherein:

the digitization module generates a final digitization of the one or more images;

the digitization module fragments an image into a first section and a second section, the first section comprises a set of one or more plot lines and the second section comprises axis regions comprising at least an x-axis and y-axis; and digitizing the one or more images comprises:

cleaning the image by removing noise from the first section of the image;

identifying axis values in the axis regions of the second section of the image;

generating a point-pixel coordinate table comprising locations of pixels and a corresponding numeric x-axis value and y-axis value for each pixel of the image; and creating a digitization of the image using the point-pixel coordinate table; and outputting the final digitization of the one or more images, wherein cleaning the image comprises:

removing vertical lines that are not part of the set of one or more plot lines;

recovering plot line information lost during the removal of the vertical lines;

eliminating annotations and other text using an optical character recognition engine;

detecting connected components left in the image; and removing connected components that are smaller than a standard plot line length for the image.

2. The method of claim 1, wherein creating the digitization of the image comprises:

creating a preliminary digitization of the image by:

preparing the image, identifying the pixels of the image that correspond to the set of one or more plot lines, and, using the point-pixel coordinate table, recording a set of y-coordinate values corresponding to each pixel of the set of one or more plot lines for a plurality of sampling points along the x-axis; and creating the final digitization of the image by:

separating the set of one or more plot lines into individual plot lines, and assigning the identified pixels of the set of one or more plot lines to one of the individual plot lines using a machine learning clustering method.

3. The method of claim 1, further comprising, after extracting the one or more images from the input document and prior to digitizing the one or more images by the digitization module, segmenting the one or more images such that one or more images are isolated from the other images.

4. The method of claim 1, wherein fragmenting the image comprises the use of contour detection.

5. The method of claim 2, wherein the machine learning clustering method is a DBSCAN clustering method.

6. The method of claim 1, further comprising:

extracting metadata from the input document; and storing, in a database, an original, undigitized version of the one or more images and the metadata extracted from the input document.

7. A system for digitizing an image, the system comprising:

a processor comprising:

a memory;

a display; and a user interface configured to receive inputs from a user;

wherein the processor is configured to:

receive an input document containing one or more images;

extract the one or more images from the input document;

digitize, without user input, the one or more images by a digitization module, wherein:

the digitization module generates a final digitization of the one or more images;

the digitization module fragments an image into a first section and a second section, the first section comprising a set of one or more plot lines and the second section comprising axis regions comprising at least an x-axis and y-axis; and digitizing the one or more images comprises:

cleaning the image by removing noise from the first section of the image;

identifying axis values in the axis regions of the second section of the image;

generating a point-pixel coordinate table comprising locations of pixels and a corresponding numeric x-axis value and y-axis value for each pixel of the image; and creating a digitization of the image using the point-pixel coordinate table; and output the final digitization of the one or more images, wherein cleaning the image comprises:

removing vertical lines that are not part of the set of one or more plot lines;

recovering plot line information lost during the removal of the vertical lines;

eliminating annotations and other text using an optical character recognition engine;

detecting connected components left in the image; and removing connected components that are smaller than a standard plot line length for the image.

8. The system of claim 7, wherein creating the digitization of the image comprises:

creating a preliminary digitization of the image by:

preparing the image, identifying the pixels of the image that correspond to the set of one or more plot lines, and, using the point-pixel coordinate table, recording a set of y-coordinate values corresponding to each pixel of the set of one or more plot lines for a plurality of sampling points along the x-axis; and creating the final digitization of the image by:

separating the set of one or more plot lines into individual plot lines, and assigning the identified pixels of the set of one or more plot lines to one of the individual plot lines using a machine learning clustering method.

9. The system of claim 7, wherein the processor is further configured to, after extracting the one or more images from the input document and prior to digitizing the one or more images by the digitization module, segment the one or more images such that one or more images are isolated from the other images.

10. The system of claim 9, wherein the processor segments the one or more images using an object detection model.

11. The system of claim 7, wherein the processor is further configured to:

extract metadata from the input document; and store, in a database, an original, undigitized version of the one or more images and the metadata extracted from the input document.

12. A non-transitory computer readable storage medium storing instructions that, when executed by one or more computer processors, cause the one or more computer processors to perform operations comprising:

receiving an input document containing one or more images;

extracting the one or more images from the input document;

digitizing, without user input, the one or more images by a digitization module, wherein:

the digitization module generates a final digitization of the one or more images;

the digitization module fragments an image into a first section and a second section, the first section comprising a set of one or more plot lines and the second section comprising axis regions comprising at least an x-axis and y-axis; and digitizing the one or more images comprises:

cleaning the image by removing noise from the first section of the image;

identifying axis values in the axis regions of the second section of the image;

generating a point-pixel coordinate table comprising locations of pixels and a corresponding numeric x-axis value and y-axis value for each pixel of the image; and creating a digitization of the image using the point-pixel coordinate table; and outputting the final digitization of the one or more images, wherein cleaning the image comprises:

removing vertical lines that are not part of the set of one or more plot lines;

recovering plot line information lost during the removal of the vertical lines;

eliminating annotations and other text using an optical character recognition engine;

detecting connected components left in the image; and removing connected components that are smaller than a standard plot line length for the image.

13. The non-transitory computer readable storage medium of claim 12, wherein creating the digitization of the image comprises:

creating a preliminary digitization of the image by:

preparing the image, identifying the pixels of the image that correspond to the set of one or more plot lines, and, using the point-pixel coordinate table, recording a set of y-coordinate values corresponding to each pixel of the set of one or more plot lines for a plurality of sampling points along the x-axis; and creating the final digitization of the image by:

separating the set of one or more plot lines into individual plot lines, and assigning the identified pixels of the set of one or more plot lines to one of the individual plot lines using a machine learning clustering method.

14. The non-transitory computer readable storage medium of claim 12, further comprising, after extracting the one or more images from the input document and prior to digitizing the one or more images by the digitization module, segmenting the one or more images such that one or more images are isolated from the other images.

15. The non-transitory computer readable storage medium of claim 14, wherein segmenting the one or more images such that each image is isolated from the other images comprises:

separating the images into categories using an object detection model, wherein a first category comprises plots and a second category comprises non-plots, wherein a plot is an image containing one or more lines describing a trend or property;

identifying a desired type of plot using a convolutional neural net; and isolating each plot of the desired types of plots from the other plots in the first category, such that the only images that are digitized via the digitization module are those images comprising a plot of the desired types.

* * * * *